United States Patent
Suchta et al.

(10) Patent No.: US 8,382,080 B2
(45) Date of Patent: Feb. 26, 2013

(54) CORD REINFORCED RESILIENT MEMBRANE

(75) Inventors: Wojciech E. Suchta, Richmond Hill (CA); Kenneth L. Oblizajek, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 913 days.

(21) Appl. No.: 12/189,321

(22) Filed: Aug. 11, 2008

(65) Prior Publication Data

US 2010/0032877 A1 Feb. 11, 2010

(51) Int. Cl.
*B60G 13/00* (2006.01)
*F16F 9/00* (2006.01)

(52) U.S. Cl. ............... 267/220; 267/140.13; 267/151; 188/321.11

(58) Field of Classification Search .......... 267/292–293, 267/140.12–140.13, 140.3, 141–141.4, 219–220; 188/321.11
See application file for complete search history.

(56) References Cited

U.S. PATENT DOCUMENTS

| | | | |
|---|---|---|---|
| 1,572,095 A * | 2/1926 | Van Der Pyl | 267/64.11 |
| 3,552,755 A | 1/1971 | Leonard | |
| 5,062,618 A * | 11/1991 | Yamada et al. | 267/140.4 |
| 5,232,209 A * | 8/1993 | de Fontenay | 267/220 |
| 5,467,971 A | 11/1995 | Hurtubise et al. | |
| 6,427,814 B1 * | 8/2002 | Miyamoto | 188/321.11 |
| 6,555,212 B2 * | 4/2003 | Boiocchi et al. | 428/295.4 |
| 7,347,437 B1 | 3/2008 | Oblizajek et al. | |
| 2008/0078635 A1 | 4/2008 | Oblizajek et al. | |

FOREIGN PATENT DOCUMENTS

| | | |
|---|---|---|
| DE | 19629959 A1 | 1/1998 |
| DE | 19729682 A1 | 3/1998 |
| JP | 02011941 A * | 1/1990 |
| JP | 5-296275 A | 11/1993 |

OTHER PUBLICATIONS

Letter reporting Chinese Office Action dated Jan. 21, 2011 for Chinese application 200910166085.X corresponding to U.S. Appl. No. 12/189,321.
The Pneumatic Tire, edited by A. N. Gent and J. D. Walter, University of Akron, published by NHTSA, Washington DC DOT Contract DTNH22-02-P-07210, Aug. 2005, pp. 120 and 150.
German Office Action dated May 16, 2012 for German application 1020090363602 corresponding to U.S. Appl. No. 12/189,321.

* cited by examiner

*Primary Examiner* — Robert A Siconolfi
*Assistant Examiner* — Anna Momper

(57) ABSTRACT

A cord reinforced resilient membrane (or diaphragm) having a high radial (transverse) stiffness and a relatively low axial stiffness, wherein the cord reinforced resilient membrane has adapatability for use in both hydraulic and conventional strut mounts, as well as other applications, and wherein the radial stiffness provided by the cords is directionally tunable for utilization in a particular application.

5 Claims, 7 Drawing Sheets

CORD REINFORCED RESILIENT MEMBRANE

TECHNICAL FIELD

The present invention relates to membranes (diaphragms) used for example in hydraulic strut mounts of motor vehicle suspension systems, and particularly to a cord reinforced resilient membrane having high radial stiffness and low axial stiffness having application, for example, to both hydraulic and conventional strut mounts.

BACKGROUND OF THE INVENTION

Motor vehicle suspension systems are configured so that the wheels are able to follow elevational changes in the road surface as the vehicle travels therealong. When a rise in the road surface is encountered, the suspension responds in "jounce" in which the wheel is able to move upwardly relative to the frame of the vehicle. On the other hand, when a dip in the road surface is encountered, the suspension responds in "rebound" in which the wheel is able to move downwardly relative to the integrated body or frame structure of the vehicle. In either jounce or rebound, a spring (i.e., coil, leaf, torsion, etc.) is incorporated with the body structure in order to provide a resilient response to the respective vertical movements of the wheel with regard to the vehicle body structure. However, in order to prevent wheel bouncing and excessive vehicle body motion, a shock absorber or strut is placed at the wheel to dampen wheel and body motion. An example of a MacPherson strut mount is disclosed in U.S. Pat. No. 5,467,971 to Hurtubise et al, issued on Nov. 21, 1995 and assigned to the assignee hereof.

It is known to provide hydraulic strut mounts, as for example disclosed in U.S. Pat. No. 7,347,437 to Oblizajek et al, issued on Mar. 25, 2008 and assigned to the assignee hereof. In this patent, a damper assembly for a suspension system of a motor vehicle includes a housing adapted to be mounted to one end of a strut of the suspension system. The housing has a chamber with fluid disposed therein. The damper assembly also includes at least one membrane extending transversely across the chamber so as to react with the fluid. The at least one membrane is composed of metal, being of a monolithic structure: integral, unitary and one piece.

What remains needed is a membrane having a high radial (transverse) stiffness and a relatively low axial stiffness, wherein such a membrane has adapatability for use in both hydraulic and conventional strut mounts, as well as other applications, and wherein the radial stiffness is directionally tunable for utilization in a particular application.

SUMMARY OF THE INVENTION

The present invention is a cord reinforced resilient membrane (or diaphragm) having a high radial (transverse) stiffness and a relatively low axial stiffness, wherein the cord reinforced resilient membrane has adapatability for use in both hydraulic and conventional strut mounts, as well as other applications, and wherein the radial stiffness is directionally tunable for utilization in a particular application.

The cord reinforced resilient membrane according to the present invention is composed of a selectively shaped, as for example a thin, sheet-like resilient membrane body of elastomeric material, as for example rubber, having embedded therewithin at least one set of cords (cord set). The cord reinforced resilient membrane may be regarded as a lamina or laminate consisting of reinforcing cords embedded in a viscoelastic matrix. The cords of the at least one cord set may be composed of, by way of nonlimiting example, nylon, polyester, rayon, steel, fiber glass, and poly-para-phenylene terephthalamide which is also known as DuPont™ Kevlar®, and may be, for example in the form of wound strands or monofilaments. The at least one cord set may be in the form of a single or multiple layers of cord sets, which may be normally or acutely angled relative to each other, being layered or woven.

By way of a nonlimiting application example to hydraulic strut mounts, the cord reinforced resilient membrane of the present invention is structured as a thin, centrally apertured membrane body providing axial compliance and rigid radial reaction. A valve (orifice) plate divides the strut mount assembly into hydraulic fluid filled upper and lower chambers. The upper chamber is bounded at its upper end by the cord reinforced resilient membrane of the present invention, and on its opposite lower end by the valve plate. The lower chamber is bounded at its lower end by a secondary resilient membrane, and on its opposite upper end by the valve plate.

The structure of the cord reinforced resilient membrane of the present invention serves two major functions: first, to carry the structural static and dynamic loads of the strut mount; and secondly, to act as a relatively incompliant volumetric boundary confinement for hydraulic fluid (in an hydraulic strut mount application). To achieve this performance in a strut mount, the cord reinforced resilient membrane provides a low axial structural stiffness and at the same time a high radial structural stiffness (the terms "low" and "high" being mutually relative).

As an example, a ratio of radial to axial stiffness (stiffness ratio) of 20 to 1 can be achieved by the cord reinforced resilient membrane of the present invention. By comparison, conventional resilient mounts and bushings made from elastomers are able to achieve stiffness ratios of only about 5 to 1 to 10 to 1; the present invention contemplates improving the stiffness ratio, for example to between substantially about 11 to 1 and 20 to 1. Further, by adjusting the direction of the sets of cords and the cords themselves and the spacing of the cords, the radial stiffness is directionally tunable to a particular application. For example, a stiffness ratio may be 20 to 1 in first radial direction and at a second radial direction, oriented at a selected angle with respect to the first radial direction, a stiffness ratio may be 16 to 1. Such differential of the radial stiffness may be tuned, as an example, as an anticipation to directional differentials in static and dynamic side loading expectancies, as well as desired suspension dynamics and transmissibilities for preferentially accommodating vibratory excitation encountered while traversing irregular road surfaces.

An hydraulic strut mount with the cord reinforced resilient membrane addresses vehicular smooth road shake and vibratory responses to mildly rough roads. Along with improving smooth road shake, provided are smoothness and plushness on coarse aggregate and rough road surfaces. Functionally, accommodated is the partially seized condition of a front strut suspension under light vertical dynamic loads, arising due to internal damper stiction which is aggravated by side loading.

Accordingly, it is an object of the present invention to provide a cord reinforced resilient membrane (or diaphragm) having a high radial (transverse) stiffness and a relatively low axial stiffness, wherein the cord reinforced resilient membrane has adapatability for use in both hydraulic and conventional strut mounts, as well as other applications, and wherein the radial stiffness is directionally tunable for utilization in a particular application.

DESCRIPTION OF THE PREFERRED EMBODIMENT

Referring now to the Drawing, FIGS. 1 through 10C depict various aspects, by way of exemplification and not limitation, of a cord reinforced resilient membrane 100 according to the present invention.

Figure 1:
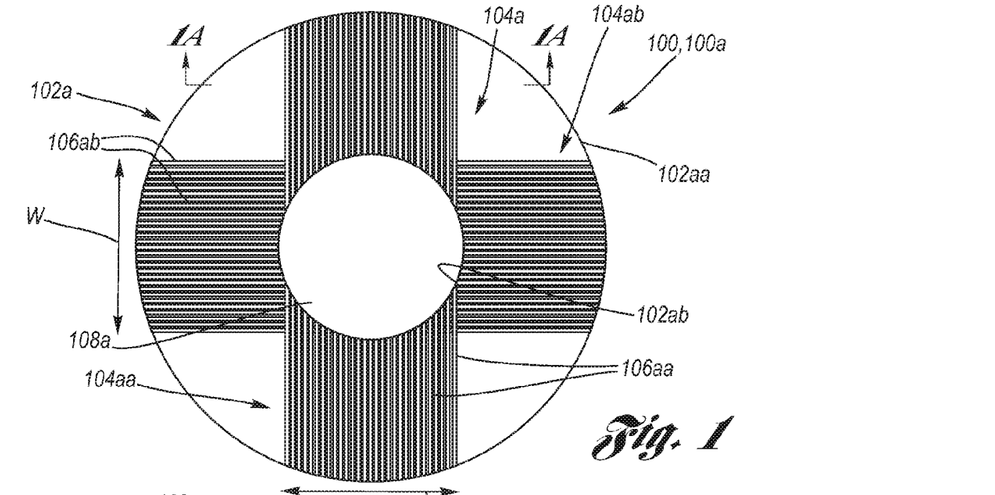
FIG. 1 is a plan view of a cord reinforced resilient membrane according to the present invention, wherein the cords are visible, and arranged as two perpendicular cord sets, each having a width about equal to that of the central aperture.
Figure 1A:
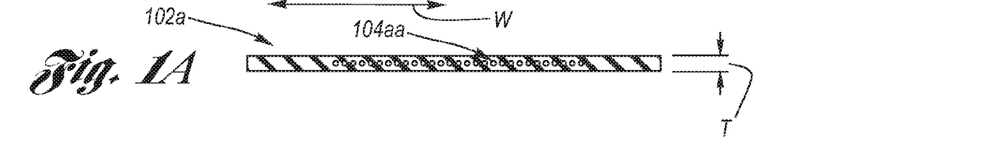
FIG. 1A is a sectional view, seen along line 1A-1A of FIG. 1.

Turning attention firstly to FIGS. 1 and 1A, a first preferred example of the cord reinforced resilient membrane 100, 100a according to the present invention is shaped in the form of a thin, sheet-like resilient membrane body 102a composed of an elastomeric material, as for example rubber, and is further composed of at least one cord set 104a embedded within the membrane body, two cord sets 104aa, 104ab, oriented perpendicular to each other, being shown by way of example in FIG. 1.

The cords 106aa, 106ab of each of the cord sets 104aa, 104ab may be composed of, by way of nonlimiting example, nylon, polyester, rayon, steel, fiber glass, and DuPont™ Kevlar®, and may be, for example in the form of wound strands or monofilaments.

In the first example of the cord reinforced resilient membrane 100a, the membrane body 102a is defined by a circular outer periphery 102aa and a circular inner periphery 102ab which demarcates a central aperture 108a of the membrane body. Each of the cord sets 104aa, 104ab is embedded in the material (e.g., rubber) of the membrane body at the time of its formation, as for example in a molding operation or other process. The cord sets 104aa, 104ab have a width W about equal to that of the central aperture 108a (or of the inner periphery 102ab) and lengths appropriate for extending to the outer periphery of the membrane body.

Because of the embedded cord sets 104a, the structure of the cord reinforced resilient membrane 100a provides a low axial structural stiffness and at the same time a high radial structural stiffness (the terms "low" and "high" being mutually relative). As an example, ratios of radial to axial stiffness (stiffness ratios) of between about 11 to 1 and 20 to 1 can be achieved by the cord reinforced resilient membrane of the present invention, which is not possible to achieve using conventional resilient sheer and/or compression-tension pads made only from elastomers.

A nonlimiting illustration of the first example of cord reinforced resilient membrane 100a follows. The membrane body 102a is composed of rubber, having a durometer (Shore-A) range of between about 45 to 65, a thickness T of about 2.5 mm, a diameter of the outer periphery of about 55 mm, a diameter of the inner periphery of about 25 mm, and a modulus (E) of about 6 MPa. The cords 106 are composed of nylon cord having an elongation under load (44 N) of about 8%, with a cord gauge of 0.5 mm, and cord cross-sectional area of about 0.2 mm², wherein the stress is about 210 MPa, and modulus (E) is about 2.6 GPa. Each cord set 104aa, 104ab has about 45 cords 106aa, 106ab, respectively, wherein the width W is about 20 mm.

As will be discussed hereinbelow, the at least one cord set may be in the form of a single or multiple layers of cord sets, which may be normally or acutely angled relative to each other, being mutually independent or mutually woven, wherein it is possible to radially tune a favored level of stiffness in one radial direction over that of another.

Figure 2:
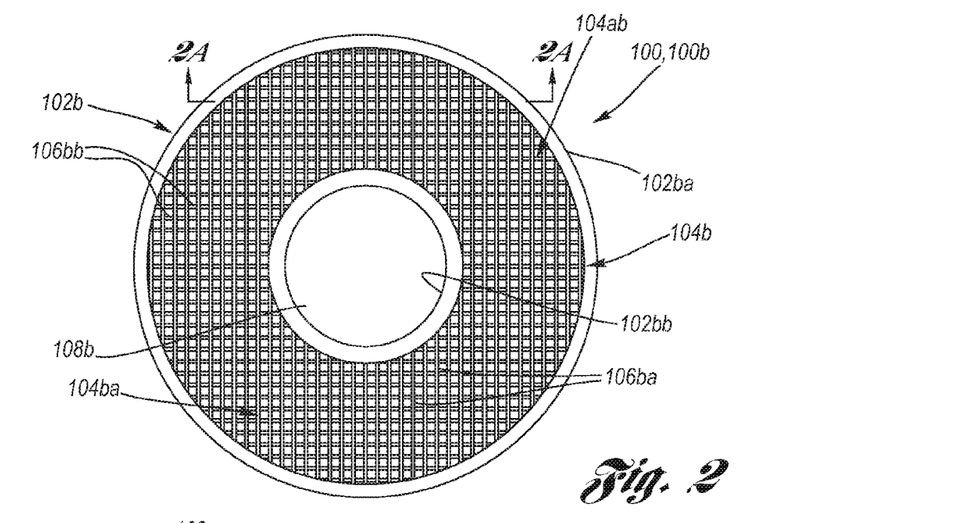
FIG. 2 is a plan view of a cord reinforced resilient membrane according to the present invention, wherein the cords are visible, and now arranged as a pair of mutually woven cord sets, each extending across the membrane body.
Figure 2A:
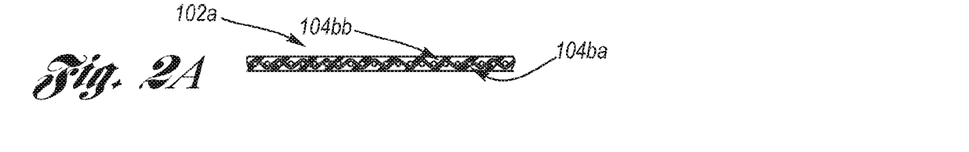
FIG. 2A is a sectional view, seen along line 2A-2A of FIG. 2.

Turning attention now to FIGS. 2 and 2A, a second preferred example of the a cord reinforced resilient membrane 100, 100b according to the present invention is shaped in the form of a thin, sheet-like resilient membrane body 102b composed of an elastomeric material, as for example rubber, and is further composed of at least one cord set 104b embedded within the membrane body, two mutually woven cord sets 104ba, 104bb, perpendicular to each other, being shown by way of example in FIG. 2.

As in the first example, the cords 106ba, 106bb of each of the cord sets 104ba, 104bb may be composed of, by way of nonlimiting example, nylon, polyester, rayon, steel, fiber glass, and DuPont™ Kevlar®, and may be, for example in the form of wound strands or monofilaments. Additionally, in the second example of the cord reinforced resilient membrane 100b, the membrane body 102b is defined by a circular outer periphery 102ba and a circular inner periphery 102bb which demarcates a central aperture 108b of the membrane body. The woven cord sets 104ba, 104bb are embedded in the material (e.g., rubber) of the membrane body at the time of its formation, as for example in a molding operation or other process. The cord sets 104ba, 104bb extend generally across the membrane body Referring now to FIGS. 3A through 3D, a brief explanation of the stiffness ratio will be provided.

Figure 3A:
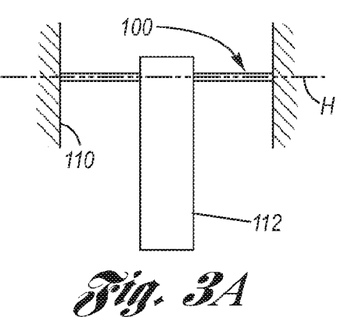
FIGS. 3A through 3D are schematic views of a cord reinforced resilient membrane according to the present invention at various positions of axial movement relative to a nominal position (shown at FIG. 3A).
Figure 3B:
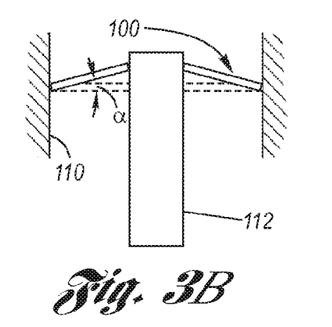
Figure 3C:
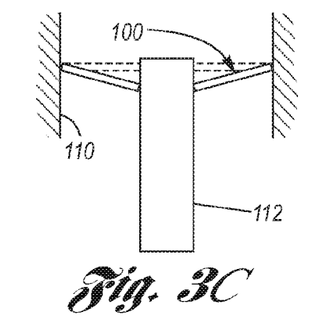

FIGS. 3A through 3C represent, schematically, axial deflections of a cord reinforced resilient membrane 100 of the present invention with respect to a stationary outer wall 110 and a movable shaft 112. At FIG. 3A the cord reinforced resilient membrane 100 is at a nominal position in which it is planar in a horizontal plane H, whereas in FIG. 3B the shaft has moved relative to the wall upwardly, causing the cord reinforced resilient membrane to follow this movement, and in FIG. 3C the shaft has moved relative to the wall downwardly, also causing the cord reinforced resilient membrane to follow this movement.

Figure 3D:
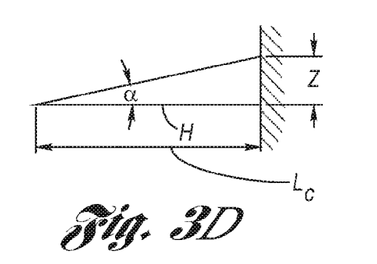

Turning attention next to FIG. 3D, parameters involved in these movements will be analyzed. For simplicity, a single cord is considered which is not pre-stressed (although the cords of the present invention may be pre-stressed). Given a cord length $L_c$, of the cord, then when the shaft relatively moves axially a distance Z (as for example from the position of FIG. 3A to that of FIG. 3B), an acute angle α is produced.

The radial stiffness $K_r$ of the membrane body 102 is equal to the radial stiffness $K_c$ of the cord, that is, $$K_r = K_c. \quad (1)$$

The axial stiffness, $K_z$, is given by:

$$K_z = ((L_c/\cos \alpha) - L_c)(K_c \cdot \sin \alpha)/Z = K_c(1 - \cos \alpha), \quad (2)$$

wherein the ratio of radial stiffness to axial stiffness, R, is given by:

$$R = K_r/K_z \quad (3)$$

Figure 4:
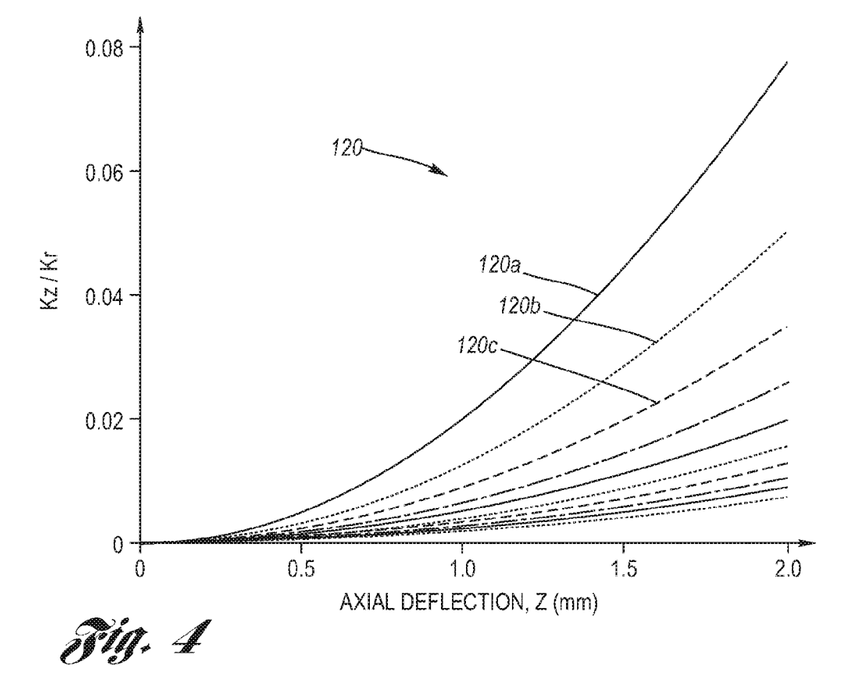
FIG. 4 is a graph of an example of axial deflection versus various stiffness ratios of the cord reinforced resilient membrane according to the present invention.

An example of application of equations 1 through 3 is depicted at FIG. 4, which is a graph 120 of axial deflection Z of the cord reinforced resilient membrane versus axial stiffness divided by radial stiffness (Kz/Kr) for various plots of cord length, $L_c$. Plot 120a is for $L_c$=10 mm, plot 120b is for $L_c$=12.5, and the remaining plots are progressively for increments of 2.5 mm of $L_c$.

Figure 5:
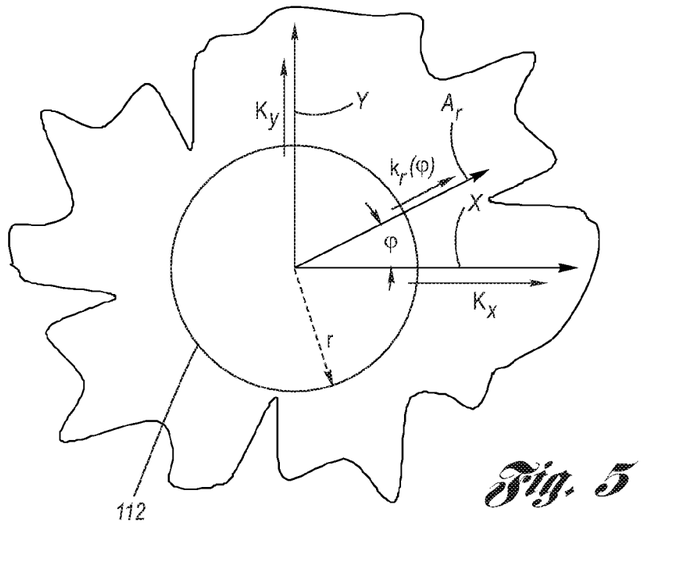
FIG. 5 is a radial (transverse) vector diagram for operational parameters of the cord reinforced resilient membrane according to the present invention.

One of the benefits of the present invention is that the radial stiffness is directionally selectable (tunable), which may be understood by additional reference to FIG. 5.

In a simplified example, a circular shaft has a radius, r, and the cord reinforced resilient membrane has two conveniently oriented (e.g., along travel and cross-car directions for motor vehicles) normal axes, X and Y, having respectively, radial stiffnesses $K_x$ and $K_y$, wherein it is to be understood that other geometries are possible and can be also mathematically analyzed along any direction, the analysis herein providing one example.

The radial stiffness density, $k_r(\phi)$, in units of stiffness per circumferential length at a radius r, along an arbitrary axis, $A_r$, at an angle φ with respect to the x axis is determined by:
the radial stiffness, $K_x$, along the x axis given by:

$$K_x = \int_{2\pi} k_r(\varphi) \cos^2(\varphi) r d\varphi, \quad (4)$$

and the radial stiffness, $K_y$, along the y axis given by:

$$K_y = \int_{2\pi} k_r(\varphi) \sin^2(\varphi) r d\varphi, \quad (5)$$

wherein the axial stiffness is given by:

$$K_z = (1 - \cos(\alpha)) \left( \int_{2\pi} k_r(\varphi) r d\varphi \right), \quad (6)$$

where α is defined at FIG. 3D.

Modalities to provide a directionality to the radial stiffness include (provided for illustrative, non-limiting purposes, and not as an exhaustive recitation): changing the number of cords of the cord sets, changing the mutual direction of the cord sets, changing the number of cord sets in one direction as compared to another direction, changing the cord diameters, cord materials or cord numbers as between the cord sets in differing directions, and changing the geometry of the membrane body.

Turning attention now to FIGS. 6 through 9A. non-exhaustive, non-limiting examples of cord set arrangements for the cord reinforced resilient membrane 100 according to the present invention are presented, wherein the radial stiffness has favored directionality (i.e., radial stiffness directional asymmetry). It is to be understood that this is presented merely by way of illustration, and that cord arrangements other than those depicted herein are contemplated by the present invention.

Figures 6, 6A, 6B:
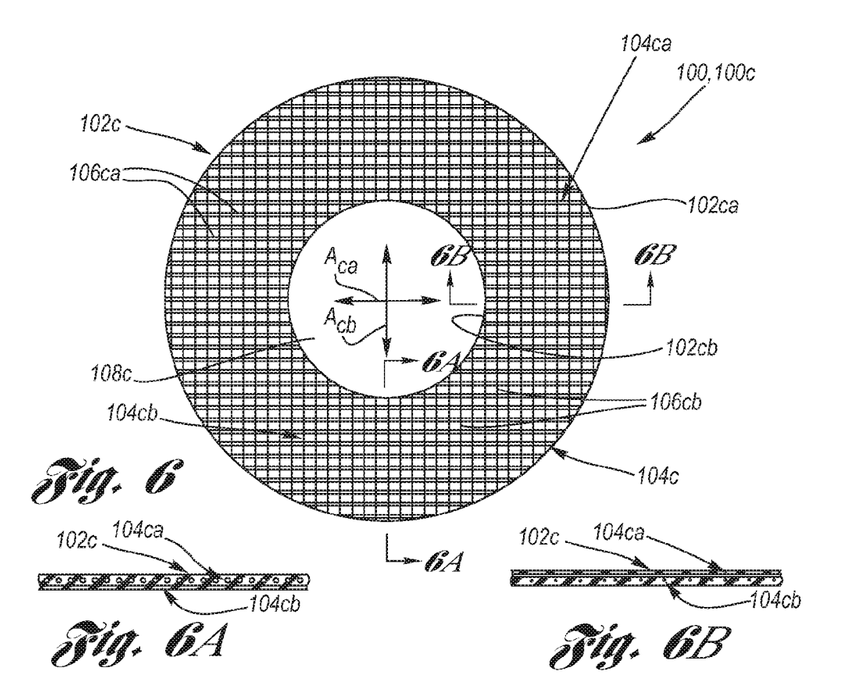
FIG. 6 is a plan view of a cord reinforced resilient membrane according to the present invention, wherein the cords are visible, and now arranged as two perpendicular cord sets, the cords being of respectively differing diameter, each extending across the membrane body.
FIG. 6A is a sectional view, seen along line 6A-6A of FIG. 6.
FIG. 6B is a sectional view, seen along line 6B-6B of FIG. 6.

In FIGS. 6 through 6B, a third example of the cord reinforced resilient membrane 100, 100c according to the present invention is shown shaped in the form of a thin, sheet-like resilient membrane body 102c composed of an elastomeric material, as for example rubber, and is further composed of at least one cord set 104c embedded within the membrane body, two cord sets 104ca, 104cb, perpendicular to each other and the cords 106ca of one cord set 104ca much thicker than the cords 106cb of the other cord set 104cb, being shown by way of example in FIG. 6.

As in the first example, the cords 106ca, 106cb of each of the cord sets 104ca, 104cb may be composed of, by way of nonlimiting example, nylon, polyester, rayon, steel, fiber glass, and DuPont™ Kevlar®, and may be, for example in the form of wound strands or monofilaments. Additionally, the cord reinforced resilient membrane 100c has the membrane body 102c being defined by a circular outer periphery 102ca and a circular inner periphery 102cb which demarcates a central aperture 108c of the membrane body. The cord sets 104ca, 104cb are embedded in the material (e.g., rubber) of the membrane body at the time of its formation, as for example in a molding operation or other process. The cord sets 104ca, 104cb extend generally across the membrane body, wherein the radial stiffness is greater along axis $A_{ca}$ than along axis $A_{cb}$.

Figure 7:
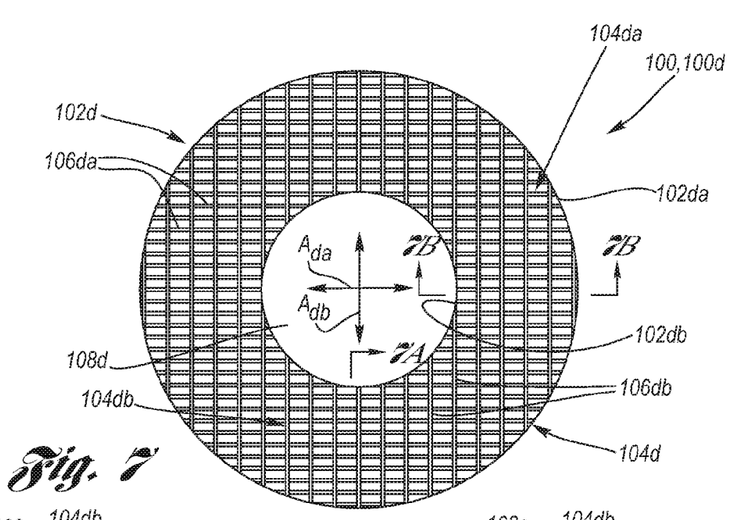
FIG. 7 is a plan view of a cord reinforced resilient membrane according to the present invention, wherein the cords are visible, and now arranged as two perpendicular cord sets, the cords sets having respectively differing numbers of cords, each extending across the membrane body.
Figure 7A:
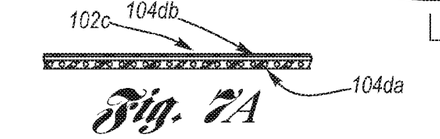
FIG. 7A is a sectional view, seen along line 7A-7A of FIG. 7.
Figure 7B:
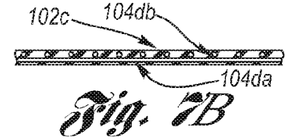
FIG. 7B is a sectional view, seen along line 7B-7B of FIG. 7.

In FIGS. 7 through 7B, a fourth example of the cord reinforced resilient membrane 100, 100d according to the present invention is shown shaped in the form of a thin, sheet-like resilient membrane body 102d composed of an elastomeric material, as for example rubber, and is further composed of at least one cord set 104d embedded within the membrane body, two cord sets 104da, 104db, perpendicular to each other and the cords 106da of one cord set 104da are spaced closer than the cords 106db of the other cord set 104db, being shown by way of example in FIG. 7.

As in the first example, the cords 106da, 106db of each of the cord sets 104da, 104db may be composed of, by way of nonlimiting example, nylon, polyester, rayon, steel, fiber glass, and DuPont™ Kevlar®, and may be, for example in the form of wound strands or monofilaments. Additionally, the cord reinforced resilient membrane 100d has the membrane body 102d being defined by a circular outer periphery 102da and a circular inner periphery 102db which demarcates a central aperture 108d of the membrane body. The cord sets 104da, 104db are embedded in the material (e.g., rubber) of the membrane body at the time of its formation, as for example in a molding operation or other process. The cord sets 104da, 104db extend generally across the membrane body, wherein the radial stiffness is greater along axis $A_{da}$ than along axis $A_{db}$.

Figure 8:
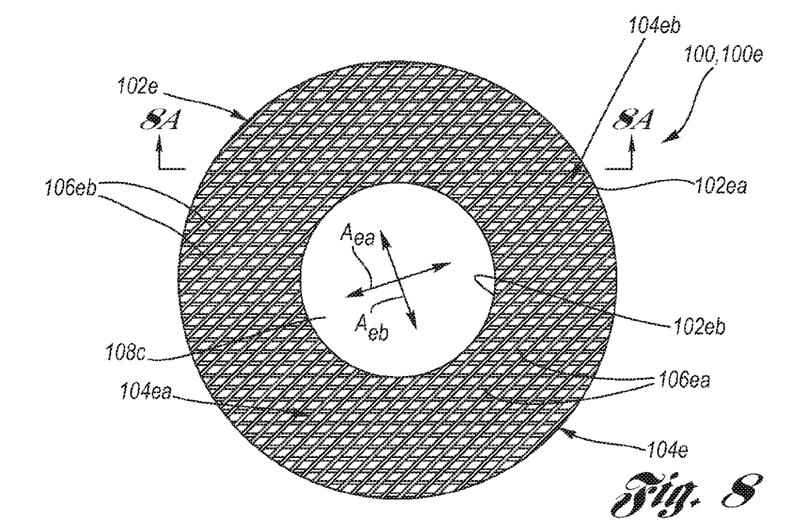
FIG. 8 is a plan view of a cord reinforced resilient membrane according to the present invention, wherein the cords are visible, and now arranged as two cord sets crossing each other at an acute angle, each extending across the membrane body.
Figure 8A:
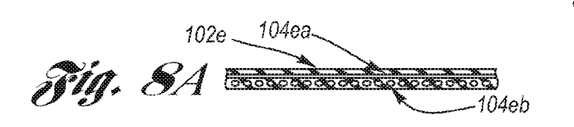
FIG. 8A is a sectional view, seen along line 8A-8A of FIG. 8.

In FIGS. 8 and 8A, a fifth example of the cord reinforced resilient membrane 100, 100e according to the present invention is shown shaped in the form of a thin, sheet-like resilient membrane body 102e composed of an elastomeric material, as for example rubber, and is further composed of at least one cord set 104e embedded within the membrane body, two cord sets 104ea, 104eb, at an acute angle to each other, being shown by way of example in FIG. 8.

As in the first example, the cords 106ea, 106eb of each of the cord sets 104ea, 104eb may be composed of, by way of nonlimiting example, nylon, polyester, rayon, steel, fiber glass, and DuPont™ Kevlar®, and may be, for example in the form of wound strands or monofilaments. Additionally, the cord reinforced resilient membrane 100e has the membrane body 102e being defined by a circular outer periphery 102ea and a circular inner periphery 102eb which demarcates a central aperture 108e of the membrane body. The cord sets 104ea, 104eb are embedded in the material (e.g., rubber) of the membrane body at the time of its formation, as for example in a molding operation or other process. The cord sets 104ea, 104eb extend generally across the membrane body, wherein the radial stiffness is greater along axis $A_{ea}$ than along axis $A_{eb}$.

Figure 9:
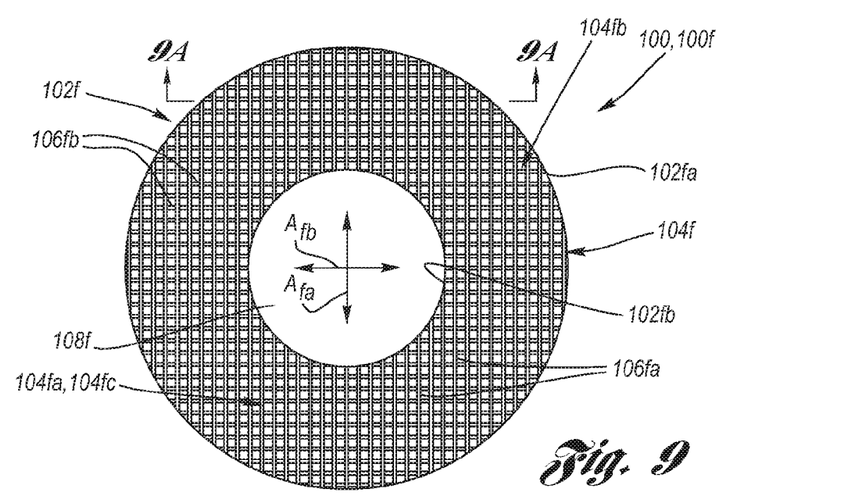
FIG. 9 is a plan view of a cord reinforced resilient membrane according to the present invention, wherein the cords are visible, and now arranged as three cord sets, wherein two cord sets are mutually parallel to each other and perpendicular to the other cord set, each extending across the membrane body.
Figure 9A:
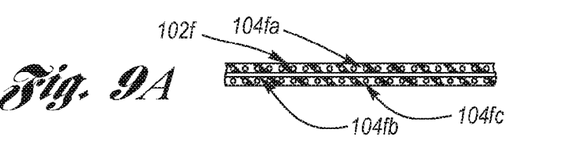
FIG. 9A is a sectional view, seen along line 9A-9A of FIG. 9.

In FIGS. 9 and 9A, a sixth example of the cord reinforced resilient membrane 100, 100f according to the present invention is shown shaped in the form of a thin, sheet-like resilient membrane body 102f composed of an elastomeric material, as for example rubber, and is further composed of at least one cord set 104f embedded within the membrane body, three cord sets 104fa, 104fb, 104fc two cords 104fa, 104fc being mutually parallel and perpendicular to the other cord set 104fb, being shown by way of example in FIG. 9 (there may be any number of cord sets parallel or mutually offset to each other).

As in the first example, the cords 106fa, 106fb, 106fc of each of the cord sets 104fa, 104fb, 104fc may be composed of, by way of nonlimiting example, nylon, polyester, rayon, steel, fiber glass, and DuPont™ Kevlar®, and may be, for example in the form of wound strands or monofilaments. Additionally, the cord reinforced resilient membrane 100f has the membrane body 102f being defined by a circular outer periphery 102fa and a circular inner periphery 102fb which demarcates a central aperture 108f of the membrane body. The cord sets 104fa, 104fb, 104fc are embedded in the material (e.g., rubber) of the membrane body at the time of its formation, as for example in a molding operation or other process. The cord sets 104fa, 104fb, 104fc extend generally across the membrane body, wherein the radial stiffness is greater along axis $A_{fa}$ than along axis $A_{fb}$.

While the foregoing embodiment illustrations show a disk shaped membrane body, it is to be understood that the membrane body may have any shape suitable to the application of its intended use. Merely by way of example and not limitation, FIGS. 10 through 11A depict the resilient body having a rectilinear shape.

Figures 10, 10A:
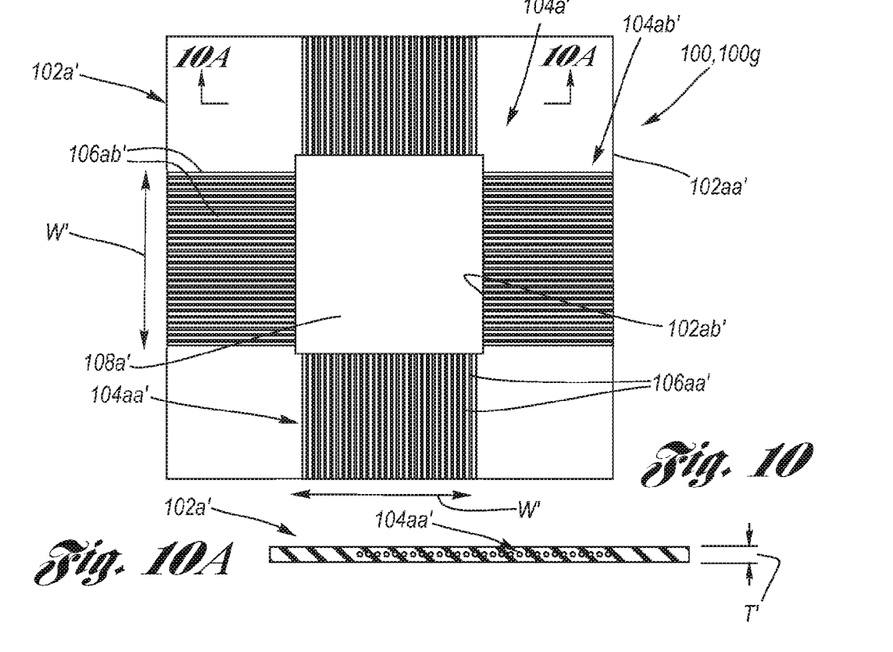
FIG. 10 is a plan view of a cord reinforced resilient membrane according to the present invention similar to FIG. 1, but now having a rectilinear geometry.
FIG. 10A is a sectional view, seen along line 10A-10A of FIG. 10.

In FIGS. 10 and 10A, a cord reinforced resilient membrane 100, 100g according to the present invention is shaped in the form of a thin (see T' in FIG. 10A), sheet-like resilient membrane body 102a' composed of an elastomeric material, as for example rubber, and is further composed of at least one cord set 104a' embedded within the membrane body, two cord sets 104aa', 104ab', oriented perpendicular to each other, being shown by way of example in FIG. 10. The cords 106aa', 106ab' of each of the cord sets 104aa', 104ab' may be composed of, by way of nonlimiting example, nylon, polyester, rayon, steel, fiber glass, and DuPont™ Kevlar®, and may be, for example in the form of wound strands or monofilaments.

The membrane body 102a' is defined by a rectilinear outer periphery 102aa' and a rectilinear inner periphery 102ab' which demarcates a central aperture 108a' of the membrane body. Each of the cord sets 104aa', 104ab' is embedded in the material (e.g., rubber) of the membrane body at the time of its formation, as for example in a molding operation or other process. The cord sets 104aa', 104ab' have a width W' about equal to that of the central aperture 108a' (or of the inner periphery 102ab') and lengths appropriate for extending to the outer periphery of the membrane body.

Figure 11:
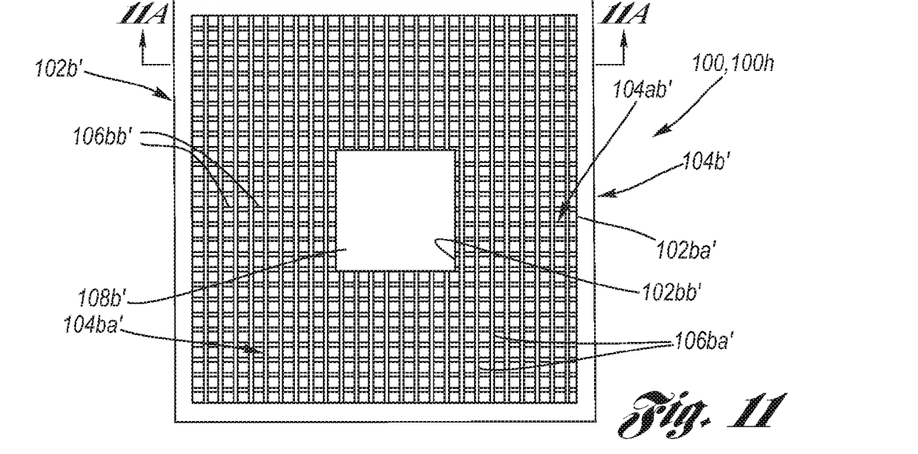
FIG. 11 is a plan view of a cord reinforced resilient membrane according to the present invention similar to FIG. 2, but now having a rectilinear geometry.
Figure 11A:
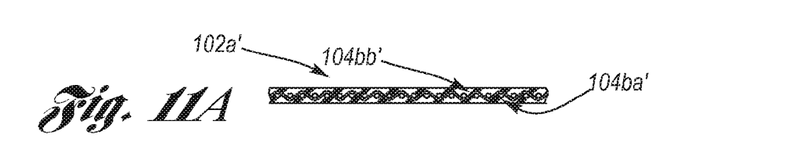
FIG. 11A is a sectional view, seen along line 11A-11A of FIG. 11.

In FIGS. 11 and 11A, a cord reinforced resilient membrane 100, 100h according to the present invention is shaped in the form of a thin, sheet-like resilient membrane body 102b' composed of an elastomeric material, as for example rubber, and is further composed of at least one cord set 104b' embedded within the membrane body, two mutually woven cord sets 104ba', 104bb', perpendicular to each other, being shown by way of example in FIG. 11. As in the first example, the cords 106ba', 106bb' of each of the cord sets 104ba', 104bb' may be composed of, by way of nonlimiting example, nylon, polyester, rayon, steel, fiber glass, and DuPont™ Kevlar®, and may be, for example in the form of wound strands or monofilaments.

The membrane body 102b' is defined by a rectilinear outer periphery 102ba' and a rectilinear inner periphery 102bb' which demarcates a central aperture 108b' of the membrane body. The woven cord sets 104ba', 104bb' are embedded in the material (e.g., rubber) of the membrane body at the time of its formation, as for example in a molding operation or other process. The cord sets 104ba', 104bb' extend generally across the membrane body.

Figure 12A:
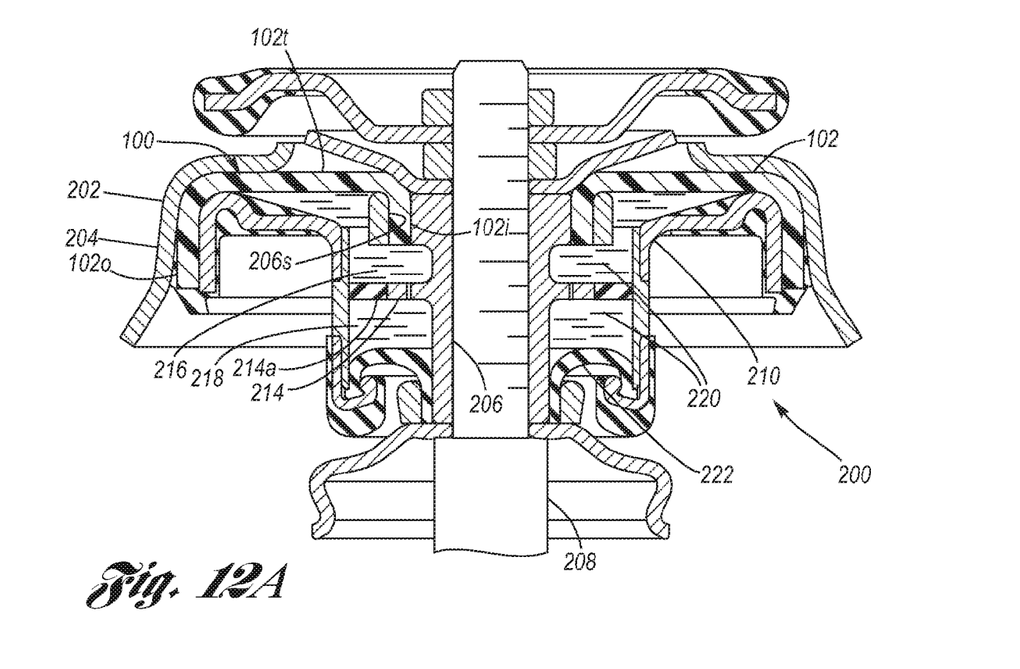
FIG. 12A is a sectional view of a hydraulic strut mount including a cord reinforced resilient membrane according to the present invention, shown at its nominal position of operation.
Figure 12B:
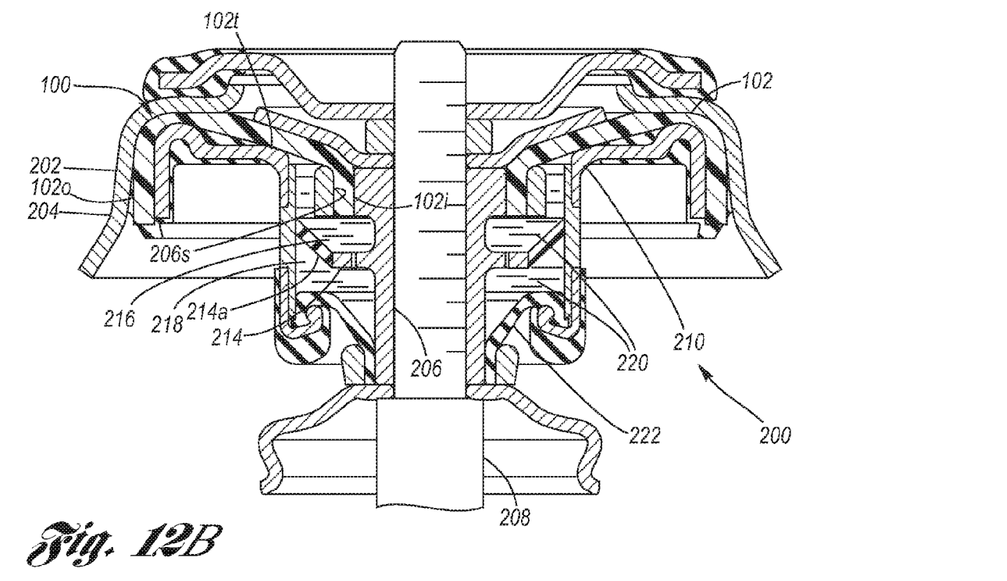
FIG. 12B is a sectional view of the hydraulic strut mount including a cord reinforced resilient membrane of FIG. 12A, now shown at its maximum rebound position of operation.
Figure 12C:
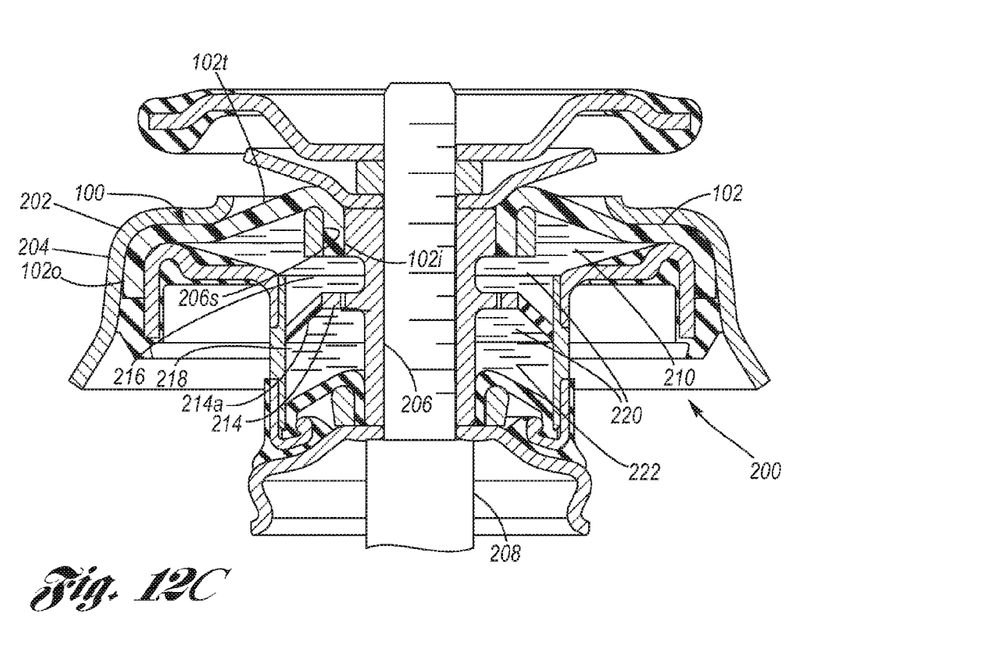
FIG. 12C is a sectional view of the hydraulic strut mount including a cord reinforced resilient membrane of FIG. 12A, now shown at its maximum jounce position of operation.

Turning attention now to FIGS. 12A through 12C, an operational application for the cord reinforced resilient membrane 100 will be detailed with respect, merely for purposes of illustration and not limitation, an hydraulic strut mount 200. The strut mount 200 is supportingly interfaced with a support shell 202 of a strut tower 204 which, at its lower end, is connected (not shown) to the body structure of a motor vehicle.

A cord reinforced resilient membrane 100 of the present invention is structured as a thin, centrally apertured membrane body 102 providing axial compliance and rigid radial reaction in the manner described hereinabove. The cord reinforced resilient membrane 100 is configured as an inverted cup-shape having an inner sidewall 102i, an outer sidewall 102o and a top sidewall 102t integrally connected to, and spanning between, the inner and outer sidewalls. The inner sidewall 102i is clamped at an annular slot 206s of a sleeve 206 which is disposed on the strut shaft 208. The outer sidewall 102o is affixed to a (for example rubber covered) metal structural member 210, wherein the outer sidewall abuts the support shell 202.

A valve (orifice) plate 214 of the sleeve 206, which includes a resilient annulus 214a that connects to the structural member 210, divides the strut mount 200 into an upper chamber 216 and a lower chamber 218, each being filled by an hydraulic fluid 220. The upper chamber 216 is bounded at its upper end by the cord reinforced resilient membrane 100, and is bounded on its opposing lower end by the valve plate 214. The lower chamber 218 is bounded at its lower end by a secondary resilient membrane 218, which may be for example composed of rubber or other elastomer, and is bounded on its opposing upper end by the valve plate 214.

The structure of the cord reinforced resilient membrane 100 serves two major functions, as can now be well understood from the description hereinbaove: first, to carry the structural static and dynamic loads of the strut mount 200; and secondly, to act as a relatively incompliant volumetric boundary confinement for hydraulic fluid 220. To achieve this performance in a strut mount 200, the cord reinforced resilient membrane 100 provides a low axial structural stiffness which allows for maximum rebound (see FIG. 12B) and maximum jounce (see FIG. 12C), yet at the same time provides a high radial structural stiffness (the terms "low" and "high" being mutually relative).

To those skilled in the art to which this invention appertains, the above described preferred embodiment may be subject to change or modification. For example, the membrane body 102 may have any arbitrary shape. Such change or modification can be carried out without departing from the scope of the invention, which is intended to be limited only by the scope of the appended claims.

The invention claimed is:

1. A strut mount for interfacing with a strut shaft, comprising:
   a membrane comprising:
      a sheet membrane body composed of a resilient material having an inner periphery and an outer periphery, a membrane diameter between said inner and outer peripheries and a membrane thickness, wherein said membrane diameter is greater than said thickness by at least about an order of magnitude; and
      at least one cord set embedded within said membrane body, said cord set comprising a plurality of cords;
      wherein said at least one cord set imparts a radial stiffness to said membrane body which exceeds an axial stiffness of said membrane body;
   a sleeve adapted for mounting to the strut shaft;
   a structural member spaced from said sleeve and adapted for being supported by the strut shaft in moving relation responsive to said strut shaft in response to jounce and rebound;
   a valve plate connected with said sleeve and said structural member;
   a secondary resilient membrane connected to said sleeve and said structural member;
   an upper chamber bounded by said membrane at one end and said valve plate at the opposite end; and
   a lower chamber bounded by said secondary resilient membrane at one end and said valve plate at the opposite end;
   wherein hydraulic fluid is disposed in said upper and lower chambers;
   wherein said membrane is connected with said inner periphery with said sleeve and at said outer periphery with said structural member such that said membrane is a substantially incompliant volumetric boundary confinement for said hydraulic fluid;
   wherein said membrane provides axial compliance to jounce and rebound while maintaining the radial stiffness; and
   wherein a ration of the radial stiffness to the axial stiffness is between substantially about 11 to 1 and 20 to 1.

2. The strut mount of claim 1, wherein said at least one cord set is arranged such that the radial stiffness is greater in at least one selected radial direction than the radial stiffness in at least another radial direction.

3. The strut mount of claim 1, wherein said at least one cord set is arranged such that the radial stiffness is greater in at least one selected radial direction than the radial stiffness in at least another radial direction.

4. The strut mount of claim 1, wherein said at least one cord set comprises a plurality of mutually woven cord sets.

5. The strut mount of claim 1, wherein:
   said membrane body is a rubber; and
   said cords are selected from the group consisting of: nylon, polyester, rayon, steel, fiberglass, and poly-para-phenylene terephthalamide.

* * * * *